(12) United States Patent
Bremnes

(10) Patent No.: US 9,253,821 B2
(45) Date of Patent: Feb. 2, 2016

(54) LOW-VOLTAGE DIRECT ELECTRICAL HEATING LVDEH FLEXIBLE PIPES RISERS

(75) Inventor: Jarle Jansen Bremnes, Fredrikstad (NO)

(73) Assignee: NEXANS, Paris (FR)

( * ) Notice: Subject to any disclaimer, the term of this patent is extended or adjusted under 35 U.S.C. 154(b) by 395 days.

(21) Appl. No.: 13/371,566

(22) Filed: Feb. 13, 2012

(65) Prior Publication Data

US 2012/0217000 A1 Aug. 30, 2012

(30) Foreign Application Priority Data

Feb. 24, 2011 (NO) .................................. 20110303

(51) Int. Cl.
| | | |
|---|---|---|
| *E03B 7/10* | (2006.01) | |
| *H05B 3/00* | (2006.01) | |
| *F16L 53/00* | (2006.01) | |
| *H05B 3/42* | (2006.01) | |
| *F16L 11/12* | (2006.01) | |
| *E21B 36/00* | (2006.01) | |
| *E21B 36/04* | (2006.01) | |
| *E21B 17/01* | (2006.01) | |

(52) U.S. Cl.
CPC .............. *H05B 3/0004* (2013.01); *E21B 17/01* (2013.01); *E21B 36/005* (2013.01); *E21B 36/04* (2013.01); *F16L 11/12* (2013.01); *F16L 53/007* (2013.01); *H05B 3/42* (2013.01); *H05B 2214/03* (2013.01)

(58) Field of Classification Search
None
See application file for complete search history.

(56) References Cited

U.S. PATENT DOCUMENTS

| | | | | |
|---|---|---|---|---|
| 3,983,360 A | * | 9/1976 | Offermann | 392/469 |
| 4,142,093 A | * | 2/1979 | Offermann | 392/469 |
| 5,241,147 A | * | 8/1993 | Ahlen | 219/629 |
| 6,142,707 A | * | 11/2000 | Bass et al. | 405/158 |
| 6,292,627 B1 | | 9/2001 | Gilchrist, Jr. et al. | |
| 6,564,011 B1 | * | 5/2003 | Janoff et al. | 392/480 |
| 6,617,556 B1 | * | 9/2003 | Wedel | 219/629 |
| 6,738,566 B2 | * | 5/2004 | Pagnella | 392/472 |
| 7,084,377 B2 | * | 8/2006 | Raterman et al. | 219/481 |
| 7,120,354 B2 | * | 10/2006 | Mackie et al. | 392/480 |
| 7,190,892 B2 | * | 3/2007 | Kertesz | 392/480 |
| 7,381,900 B2 | * | 6/2008 | Bremnes et al. | 174/102 R |
| 7,629,535 B2 | * | 12/2009 | Espen | 174/102 R |
| 7,687,745 B2 | * | 3/2010 | Kertesz | 219/535 |
| 8,559,800 B2 | * | 10/2013 | Ellis et al. | 392/468 |
| 8,592,731 B2 | * | 11/2013 | Schild et al. | 219/535 |
| 2007/0044992 A1 | * | 3/2007 | Bremnes | 174/102 R |
| 2007/0240893 A1 | * | 10/2007 | Bremnes et al. | 174/36 |
| 2008/0298788 A1 | * | 12/2008 | Martucci et al. | 392/472 |

FOREIGN PATENT DOCUMENTS

| | | |
|---|---|---|
| GB | 2341442 | 3/2000 |
| NO | 165462 | 11/1990 |

OTHER PUBLICATIONS

International Search Report dated Sep. 23, 2011.

* cited by examiner

*Primary Examiner* — Thor Campbell
(74) *Attorney, Agent, or Firm* — Sofer & Haroun, LLP

(57) ABSTRACT

A system for electrical heating of risers or pipes has at least two concentric layers of metal wires adapted to be used for low-voltage direct electric heating (LV-DEH), each pair being provided to heat a specific segment of a riser or a pipe. The system can be used for both the pipeline and the riser up to a top side.

7 Claims, 3 Drawing Sheets

LOW-VOLTAGE DIRECT ELECTRICAL HEATING LVDEH FLEXIBLE PIPES RISERS

RELATED APPLICATION

This application claims the benefit of priority from Norwegian Patent Application No. 2011 0303, filed on Feb. 24, 2011, the entirety of which is incorporated by reference.

BACKGROUND OF THE INVENTION

1. Field of the Invention

The present invention relates generally to the field of subsea electrical power cables. More specifically, it relates to a system for low voltage direct electrical heating (DEH) of a coaxial pipe or riser.

2. Description of the Related Art

The temperature of the oil or condensate in the underground reservoirs is typically about 90° C. The oil or condensate well stream contains several liquid substances that freeze when the temperature drops. This is a problem when the pipes are cooled in seawater, particularly during a shutdown of production, which causes the flow in the line to be impeded or even blocked due to the formation of hydrates or wax plugs. To solve this problem chemical treatments are mainly used. However, this has considerable operational costs and presents a risk to the environment should a leakage occur. Chemicals are used to prevent hydrate or wax formation during production shut-downs.

As an alternative to chemical treatment, hot water lines and electric heating has been in use for some years. Early ideas on how to extend DEH to include the production riser are all focused on utilizing one and the same electrical current, which invariably results in the need for high-voltage (HV) insulation in the riser.

Indirect heating using hot water or electrical heating cables will not dissipate heat at the optimal position within the riser. In addition, hot water will loose temperature with increasing depth and distance to a topside host. Use of chemicals is generally unwanted, mainly due to logistics and cost. Series connection with an existing DEH system, using a piggyback cable, would result in a need for high-voltage insulation, and also introduce uncontrolled current flow from sea water to topside structure.

In a paper, ISOPE 2000 (Halvorsen, Lervik and Klevjer), are described some different DEH-concepts. Three DEH-concepts are illustrated in FIG. 4 of said paper (not attached here) where:

a) is a common DEH-concept (DEH-a) for heating of a flowline and where the riser is excluded from the DEH. This concept is how DEH is utilized today. In operation, a current flows from a 50 (or 60) Hz alternating current (AC) power source on a platform, down to an isolated forward cable from the platform further down to and along the pipeline laying on the sea bed fastened to the pipeline as a piggyback cable and grounded at a far end. The current flows through this cable and returns via the pipeline to the point where the riser is connected to the pipeline. From this point the current is led through a separate return cable up and back again to the power source on the platform. Because the pipeline is grounded at both ends, a parallel current is flowing in the water surrounding the pipeline on the sea bed.

b) is a DEH-concept (DEH-b) where DEH is extended to cover the pipeline as well as the pipeline on the sea bottom. A current flows from a 50 (or 60) Hz AC power source on a platform, along a piggyback cable downwards along the riser and further along the pipeline. The piggyback cable is connected to the pipeline and to ground at a far end. The current returns via the pipeline and further on to the end of the pipe in the riser. At the platform, the current is led back again to the power source on the platform. Because the pipeline and the pipe in the riser are grounded at their ends, parallel currents are in this configuration flowing in the water surrounding the pipeline and surrounding the pipe in the riser. Electrical current flowing in the pipe in the riser will generally be different from the current flowing in the pipeline on the sea bottom, with the current difference flowing in sea water.

c) is a DEH-concept (DEH-c) where DEH is extended to cover the pipeline as well as the pipeline on the sea bottom like in DEH-c, but where the riser/flowline connection is insulated and not grounded at this point. This forces the same electrical current to flow in the pipe in the riser and in the pipeline on the sea bottom.

A problem with the DEH-a is that the last part of the pipeline e.g. the riser, umbilical or stiff pipe, is not getting heated by the DEH.

A problem with the DEH-b is that the high voltage and the resulting not well controlled current in the surrounding water are potential threats to safe operation. Depending on the construction, high-voltage (HV) insulation will probably be required in the riser. Said not well controlled current may potentially amount to several hundred amperes. DEH-b will therefore hardly get accepted for use in the oil industry. For dynamic/free-hanging risers, another problem is related to the need to attach the piggyback cable to the dynamic riser. A piggyback element like this will generally result in unpredictable dynamic behavior of the dynamic riser, and may adversely influence clashing and/or fatigue properties of the riser.

DEH-c has the same drawbacks regarding security as DEH-b, the only functional difference being that the electrical current flowing through the riser is the same as that flowing through the pipeline on the sea bottom. Whether the current to be transferred from sea water to production unit (offshore platform or onshore) is larger or smaller than for DEH-b depends mainly on differences in geometry and material properties between riser and pipeline on sea bottom.

A direct heating system is based on the fact that an electric current in a metal conductor generates heat due to ohmic losses. In US2002122664 to Nexans, a system for heating a flow line including an umbilical is presented. In this application, the pipeline itself is used to dissipate ohmic losses and therefore also acts as a heating element. A separate insulated conductor is used to supply forward current. In this system, the far end related to a production platform, is the ground reference which is in electrical contact with the sea. The other end is insulated from the sea. This results in the voltage difference between the production line and the sea is increasing when moving from the far end and towards the platform. A disadvantage with this system is that the voltage difference between the sea and the pipeline will result in the need for high voltage (HV) insulation at the platform and some distance along the pipeline.

GB2435347 and GB2437161, both to Nexans, describe two other systems for DEH which are based on separate piggyback cables. GB2457791, also to Nexans, introduces yet another system with a piggyback cable. This application describes a system where the pipeline and the piggyback cable are placed together inside a magnetic core.

SUMMARY OF THE INVENTION

The present invention seeks to provide a low voltage direct electric heating (LV-DEH) system which can be used for heating of the pipe-line part close to a top-side or on-shore structure. One problem is that extending a DEH system of today, this last step will invariably result in large electrical stray currents in sea water that are difficult to control at the transition from water to air as ambient. Another problem is that the resulting voltage at this end of a DEH system for many installations will be high voltage (HV) requiring HV insulation which adds complexity, cost and safety issues. "High voltage", as used in international standardization bodies like IEC, corresponds to systems having a (AC) voltage to earth exceeding $1000/\sqrt{3}$ V=577 V. Minimum voltage required to create a stable electric arc in air at atmospheric pressure and an electrode distance of some millimeters is in the range 500-700 V. (The absolute minimum arc voltage of 377 V for air at 1 atmosphere, as given by Paschen's law, corresponds to an electrode distance of 7.5 micrometers.) Power systems operated at line voltages up to an including 1000 V are defined by IEC 60038 as "low voltage".

According to a first aspect of the present invention, the LV-DEH-system comprises at least two separate concentric layers of metal wires for supplying AC-current, one acting as a forward conductor and the other acting as a return current. The layers being adapted to be used for low-voltage direct electric heating. The term "LV" (low voltage) is used to indicate a supply voltage typically well below 500 V to earth and not exceeding 577 V to earth, in correspondence with IEC 60038. Consequently, the risk of electric arcing at the topside/onshore end is very small.

Optionally the LV-DEH system is electrically separated from other direct electric heating systems.

More specifically, the invention relates to system for electrical heating of risers or pipes. The main technical feature of such system is that it comprises at least two pairs of concentric layers of metal wires, each pair of layers being adapted to be used for low-voltage direct electric heating and being provided to heat a specific segment of a riser or a pipe.

Advantageously, the electrical heating system is used for heating flexible risers or pipes.

Preferentially, each pair of concentric layers is electrically separated from other pair of concentric layers in order to reduce an undesired voltage and an undesired current at a top side.

Advantageously, each pair of concentric layers is electrically separated from the other pair of concentric layers in order to reduce an undesired voltage and an undesired current at a top side.

Preferentially, at least one layer of each pair is existing armour for said riser or pipe.

Advantageously, at least one layer of each pair has a higher conductivity than the other layer in order to direct power dissipation.

Preferentially, the current has a frequency of more than 60 Hz for reducing the electrical current in ambient water.

Advantageously, each pair of concentric layers has its own current source.

DESCRIPTION OF THE DIAGRAMS

Embodiments of the present invention will now be described by way of example, with reference to the following diagrams:

Figure 3:
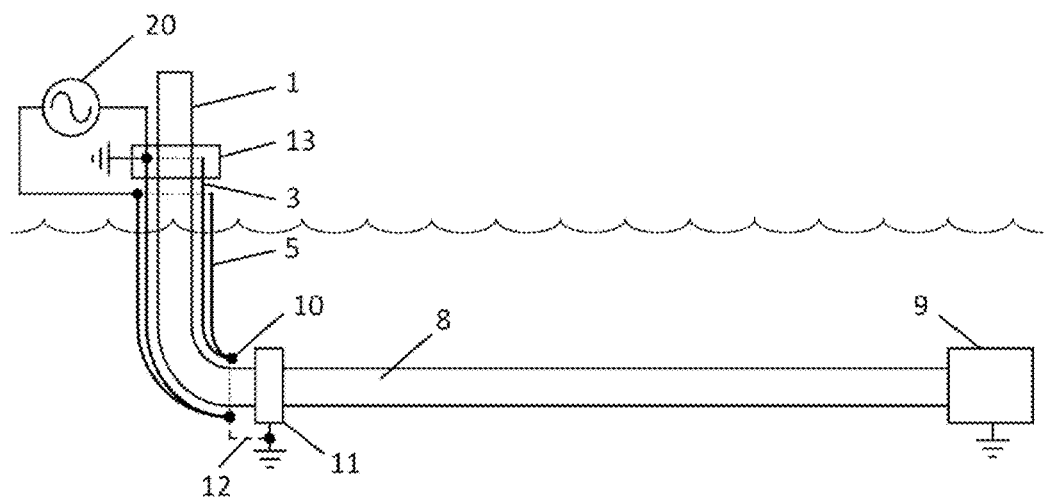
Figure 4:
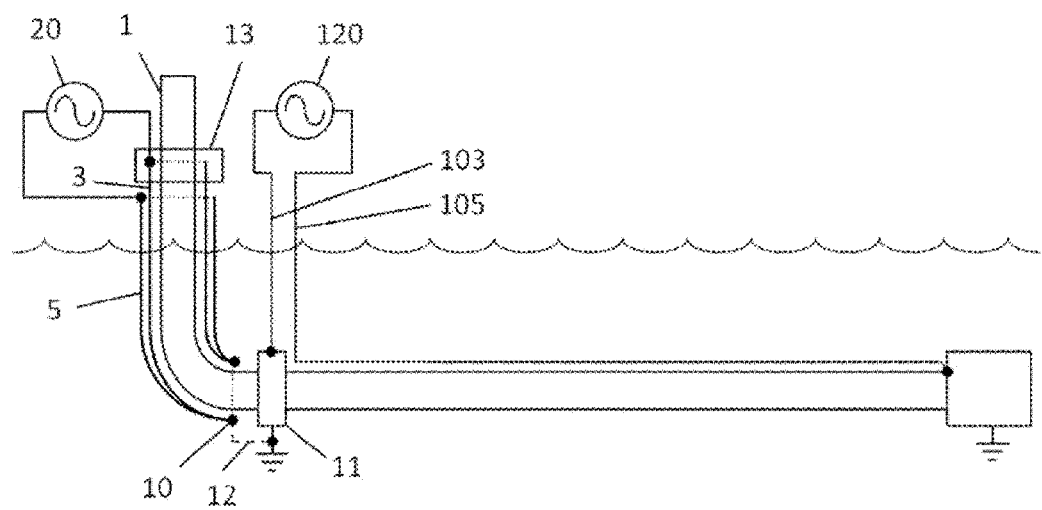

FIG. 3 is a schematic diagram of an off-shore pipeline with a top-side or on-shore termination or riser installation with the LV-DEH invention installed; and FIG. 4 is a schematic diagram of an off-shore pipeline with a top-side or on-shore termination or riser installation with the LV-DEH invention installed and which also includes a DEH system for heating of the pipeline at the sea bottom separated from the LV-DEH system.

DESCRIPTION OF EMBODIMENTS OF THE INVENTION

Figure 1:
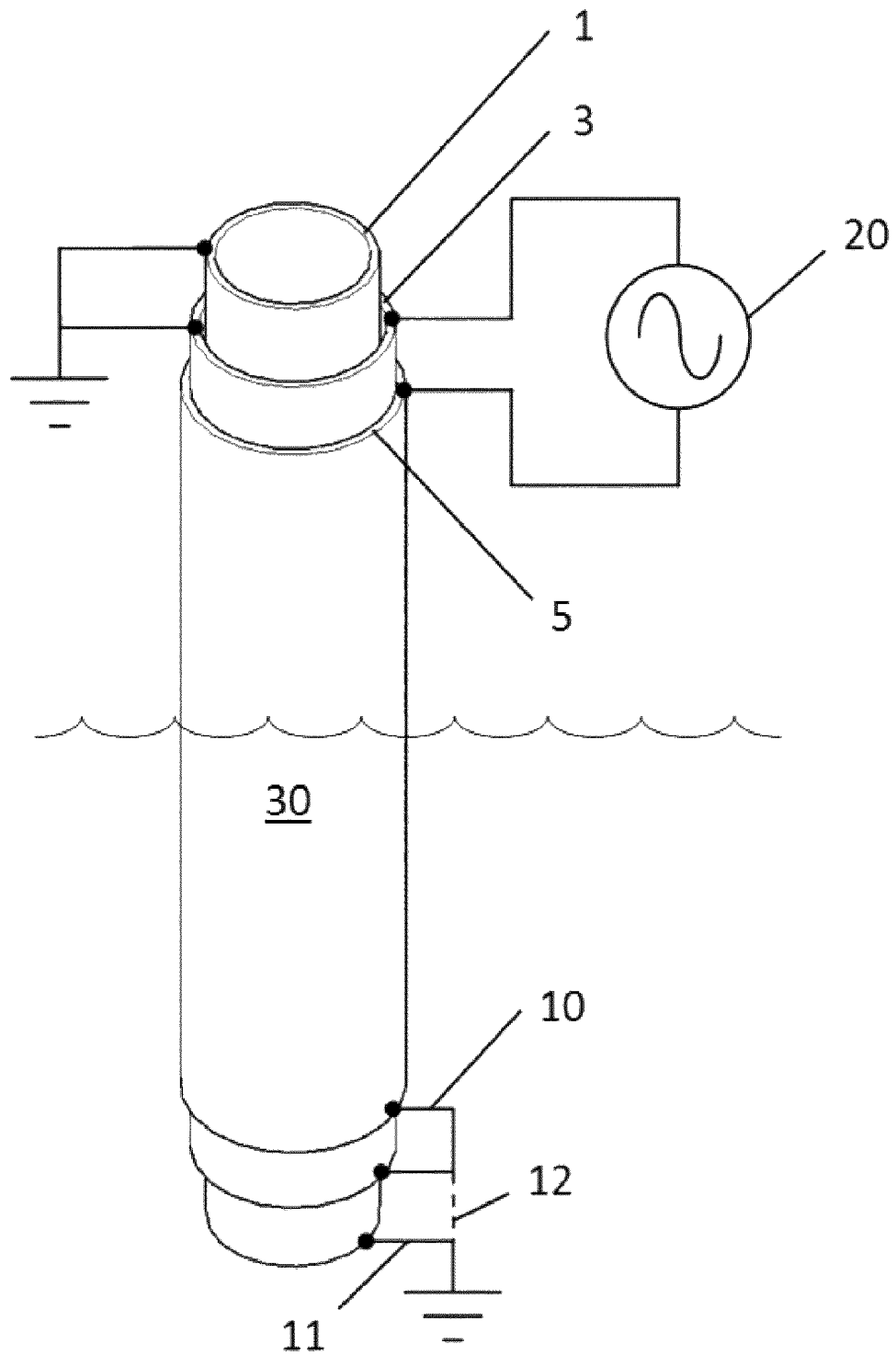
FIG. 1 is a principle drawing of the basic connections involved in the invention.

Referring to FIG. 3 and to FIG. 1 there is shown a schematic illustration of a section of a pipeline that is heated with a LV-DEH system. An alternating current (AC) is introduced from a current source 20 supplying a fixed frequency, typically within a range extending from 50 Hz up to several kHz, to an upper side of a concentric conductor comprising copper or steel wires 5 acting as a forward cable. This conductor comprises at least one layer of wires. The current flows downwards to a patch connection 10 where this forward cable is connected to the steel armour wires 3 acting as a return path for the electrical current. This patch may optionally be grounded through a patch connection 12. The steel armor wires 3 are terminated in a topside termination 13 which is also connected to the topside or onshore structure and is therefore grounded. This termination 13 concludes the return path of the current to the current source 20.

Figure 2:
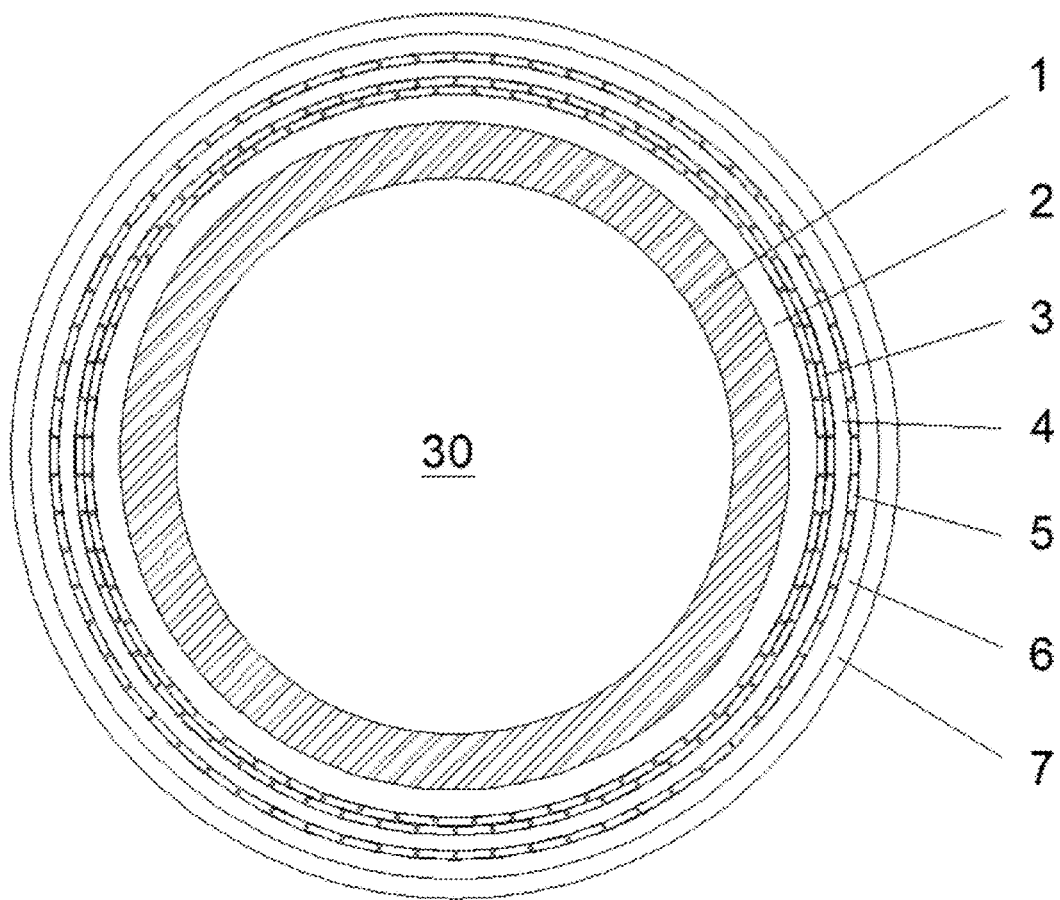
FIG. 2 is a cross section of a typical riser utilizing the present invention.

Referring to FIG. 2 the pipe 1 of the riser 30 to be heated has at least one outer layer of polymer sheath 2 acting as mechanical protection. This at least one layer preferably comprises good thermal conductance to ease heat transfer from the armour wires 3. The armor wires 3 preferably have a specific electrical resistance per distance which is expected to be higher than that of the copper or steel wires 5. In this case, most of the heat then is produced closer to the pipe 1 where it is needed. Between the armor wires 3 and the copper or steel wires 5, is one or more sheath layer comprising electrical and optionally thermal insulation 4. Outside the at least one layer of copper or steel wires 5, at least one layer comprising electrical and or thermal insulation 6 is to be found. On the outside of this, there is at least one sheath for mechanical protection 7.

FIG. 4 shows this section used together with a conventional DEH for a pipeline along the sea bed. A preferred embodiment of the present invention will now be described with reference to these figures. By splitting the heating in two separate DEH systems, one involving a first pair (3, 5) of concentric layers of metal wires, and the other involving a second pair (103, 105) of concentric layers of metal wires, important advantages are obtained. In a conventional DEH system for heating pipelines, the forward and return cables are connected and grounded at the far end, near the Pipe Line End Module (PLEM). Increasing proportionally with the length of the pipeline, the voltage at a position at the platform end can get rather high. Up to 30 kilovolts or more to ground can be expected. Such high voltages exceed what would be acceptable for the electrical insulation layers 4 and 6, and additional semiconducting layers would have to be added in order to stay in line with cable design requirements in e.g. IEC 60502-2. More or less uncontrolled current flow from sea water to a topside structure also result from "traditional" DEH systems, using a discrete piggyback cable. The resulting currents from the sea water can potentially amount to several hundred amperes, DEH systems therefore are not continued up to the platform itself, nor to an onshore power source. At the sea bed, the distance from the sea bed and a platform is normally large enough so that these voltages and currents from DEH systems of today do not pose any big problems for top side installations. The invention involves introducing a separate and improved LV-DEH system for the last step up to the platform. This is illustrated in FIG. 4, where a separate 50 (or 60) Hz AC source 120 is used for the conventional DEH system heating the pipeline on the sea bed. The voltage at the top side end can then be kept at a much lower voltage typically below 500 volts per kilo-ampere and kilometer (V kA$^{-1}$ km$^{-1}$), such that it complies with international definitions of "low voltage" (LV). The actual voltage must be evaluated on a case-to-case basis, as it will depend on riser design, heated length, required heating current, which again depends on the riser's heating requirement, and choice of operating frequency. The actual reduction in sea current compared to traditional DEH systems will also be dependent on parameters like the dimensions of the riser (e.g. center tube, armor, copper conductor), but by principle the coaxial design must result in significantly less sea current. Additional significant reduction of sea current can be achieved by selecting a higher operating frequency. However, alternative embodiments involving increased frequency also implies increased supply voltage, implying that case-by-case optimization is required. Depending on final system design and magnitude of the residual sea current, it may be found necessary to design an electrode system for collecting circulating currents in sea water below the platform or at a distance from the shore line. Unless the pipe 1 of the riser is electrically insulated from the topside or onshore electrically grounded structure, some current will also be induced and circulate in the conductive loop comprised by the pipe 1 and sea water. However, given that the pipe contents are not electrically insulating, it is not considered safe to insulate the pipe in the riser from topside/onshore earth. Consequently, some residual current will circulate in the electrically conductive loop comprised by pipe and sea water.

In another embodiment, the whole installation is installed in shallow waters. Such installations do not necessary need expensive and flexible risers. The pipeline as deployed at the sea bed is routed directly to the topside/onshore end (not presented on a figure). A split between a convention DEH system along the pipeline at the bottom of the sea and the last section having LV-DEH is in this case not where a conventional riser is connected to the pipeline, because the (flexible) riser as such is eliminated. Instead the place of the split between the two DEH systems is chosen so that the resulting disturbing current in the sea near topside and the disturbing voltage at the same area gets minimized when the components from the two DEH systems are combined.

It is in practice difficult to avoid electrical current flowing through the water. The optional junction 12 connects the patch 10 to earth and is available in cases where this is advantageous. The electrical current in the sea water may be influenced by this optional junction, but because the current in the sea water depends on a number of different parameters the use of the junction, its use will only be noted but can be used on a case by case basis.

A static pipeline is indicated by 8. A transition module 11 is used to connect the static pipeline with a riser 1. The transition module 11 is connected to earth via an anode for cathodic protection of the static pipeline 8 and for the flexible or stiff steel pipe 1 of the riser 30.

In yet another embodiment, the frequency of the AC source 20 of the LV-DEH system is increased in order to generate higher ohmic losses within the riser, but possibly also to reduce the electric current flowing in the water outside the riser. The frequency can be increased from 50 (or 60) Hz, up to several kHz in order to improve efficiency and reduce sea current but not more than allowed by the "low voltage" limitation at the topside/onshore end.

In the present document, the words riser, flexible line and flexible pipe as well as the words pipeline, line, riser and umbilical are generally intended to represent the same. When a riser comprises a pipe, the distinction between these is self explained.

The invention claimed is:

1. Low voltage system for electrical heating of a pipeline and a riser that are connected together, said low voltage system comprising:
   two separate direct electrical heating systems, a first system for said pipeline and a second for said riser,
   said first system formed from a pair of concentric metal wires that is disposed over said pipeline;
   said second system is formed from a pair of concentric metal wires that is disposed over said riser; and
   wherein said pairs of concentric metal wires from said first and second system each have a first layer of metal wires, made of either copper or steel, acting as a forward cable for the electrical current and another layer acting as a return path for the electrical current,
   wherein the metal wires acting as a return path for the electrical current in said pairs from said first and second systems have an electrical resistance per distance that is higher than that of wires of the forward cable layer.

2. Low voltage system according to claim 1, where the riser and pipeline are flexible.

3. Low voltage system according to claim 1, where said two direct electrical heating systems are electrically separated from one another in order to reduce an undesired voltage and an undesired current at a top side.

4. Low voltage system according to claim 1, where at least one of said two concentric, wires is an existing armour for said riser.

5. Low voltage system according to claim 1, where at least one of said two concentric layers has a higher conductivity than the other layer, in order to direct power dissipation.

6. Low voltage system according to claim 1, where the current has a frequency of more than 60 Hz for reducing the electrical current in ambient water.

7. Low voltage system according to claim 1, where each electrical heating system has its own current source.

* * * * *